US012526331B2

United States Patent
Song et al.

(10) Patent No.: US 12,526,331 B2
(45) Date of Patent: Jan. 13, 2026

(54) ADAPTIVE MEDIA STREAMING METHOD AND APPARATUS ACCORDING TO DECODING PERFORMANCE

(71) Applicant: HANWHA TECHWIN CO., LTD., Seongnam-si (KR)

(72) Inventors: Byung In Song, Seongnam-si (KR); Sweung Won Cheung, Seongnam-si (KR)

(73) Assignee: Hanwha Vision Co., Ltd., Seongnam-si (KR)

(*) Notice: Subject to any disclaimer, the term of this patent is extended or adjusted under 35 U.S.C. 154(b) by 223 days.

(21) Appl. No.: 17/734,229

(22) Filed: May 2, 2022

(65) Prior Publication Data
US 2022/0263885 A1    Aug. 18, 2022

Related U.S. Application Data

(63) Continuation of application No. 15/660,169, filed on Jul. 26, 2017, now abandoned.

(30) Foreign Application Priority Data

Nov. 7, 2016  (KR) .......................... 10-2016-0147633

(51) Int. Cl.
*H04L 65/75* (2022.01)
*H04L 65/61* (2022.01)
(Continued)

(52) U.S. Cl.
CPC ............ *H04L 65/764* (2022.05); *H04L 65/61* (2022.05); *H04L 65/65* (2022.05);
(Continued)

(58) Field of Classification Search
CPC ....... H04L 65/764; H04L 65/61; H04L 65/65; H04N 21/23439; H04N 21/4516;
(Continued)

(56) References Cited

U.S. PATENT DOCUMENTS

2006/0220930 A1* 10/2006 Lee ................ H04N 21/440281
348/E5.005
2011/0022984 A1*  1/2011 van der Meulen . G06F 9/44526
715/830
(Continued)

OTHER PUBLICATIONS

Guolei Zhu et al: "HTML 5 based media player for real-time video surveillance", Image and Signal Processing (CSIP), 2012 5th International Congress on, IEEE, Oct. 16, 2012, pp. 245-248.
(Continued)

*Primary Examiner* — Joshua D Taylor
(74) *Attorney, Agent, or Firm* — McLean IP Global; Jason Y. Pahng

(57) ABSTRACT

A method and apparatus for streaming media without installing a plug-in in a web browser are provided. When a JavaScript decoder is used to stream media without installing a plug-in, it is difficult to support decoding of high framerate and high resolution video due to the limitations of JavaScript. When streaming media using a video element of HTML5 without installing a plug-in, a compatibility issue with a conventional video capturing apparatus using RTSP/RTP and an initial delay problem due to a container of MPEG-DASH are inherent. The present disclosure presents an adaptive media streaming method and apparatus capable of performing streaming of high framerate and high resolution video without an initial delay and compatibility issues by addressing these drawbacks.

13 Claims, 8 Drawing Sheets

(51) Int. Cl.
  *H04L 65/65*    (2022.01)
  *H04N 21/2343*  (2011.01)
  *H04N 21/45*    (2011.01)
  *H04N 21/61*    (2011.01)
  *H04N 21/81*    (2011.01)
  *H04N 21/845*   (2011.01)

(52) U.S. Cl.
  CPC ... *H04N 21/23439* (2013.01); *H04N 21/4516* (2013.01); *H04N 21/6125* (2013.01); *H04N 21/8173* (2013.01); *H04N 21/8193* (2013.01); *H04N 21/8456* (2013.01)

(58) Field of Classification Search
  CPC .......... H04N 21/6125; H04N 21/8173; H04N 21/8193; H04N 21/8456
  See application file for complete search history.

(56) References Cited

U.S. PATENT DOCUMENTS

| | | | |
|---|---|---|---|
| 2016/0029002 A1 | 1/2016 | Balko | |
| 2016/0088015 A1* | 3/2016 | Sivan | H04L 9/40 726/23 |
| 2016/0173959 A1 | 6/2016 | Seema et al. | |
| 2017/0070792 A1* | 3/2017 | Shaw | H04N 21/41407 |
| 2018/0103261 A1* | 4/2018 | Sun | H04N 19/51 |

OTHER PUBLICATIONS

EP Summons issued on Feb. 9, 2023 for EPO Application 17 200 312.1.

\* cited by examiner

ADAPTIVE MEDIA STREAMING METHOD AND APPARATUS ACCORDING TO DECODING PERFORMANCE

CROSS-REFERENCE TO THE RELATED APPLICATION

This application is a continuation of U.S. application Ser. No. 16/889,809 filed on Jun. 2, 2020. In addition, this application claims priority from Korean Patent Application No. 10-2016-0147633, filed on Nov. 7, 2016 in the Korean Intellectual Property Office, the disclosure of which in its entirety is herein incorporated by reference.

BACKGROUND

1. Field

Apparatuses and methods consistent with example embodiments relate to streaming media captured by a media service apparatus without a plug-in in a user's web browser, and more particularly to an adaptive media streaming method and apparatus for applying various decoders according to decoding performance.

2. Description of the Related Art

In order for a media streaming apparatus to stream media captured by a media service apparatus, a plug-in may be used. A plug-in is software usually created by a third party, and is used to display various types of files, which cannot be displayed by a web browser, on a web page or to add various functions, which cannot be performed by the web browser, to the web browser. The most popular plug-in used to stream media is Adobe's Flash Player plug-in.

A plug-in can expand the performance of the web browser, but it has a drawback of being vulnerable to security attacks. It is often exploited as a path for injecting malicious code because it is necessary to agree to install the plug-in in order to execute a specific function in the web browser.

As a method of streaming media in a web browser without a plug-in, an HTML5 video element and MPEG-DASH may be used. HTML5 is the latest version of Hypertext Markup Language (HTML), which allows media playback with relatively good performance using the video element embedded in a web browser without installing a plug-in. MPEG-DASH is a standard also known as Dynamic Adaptive Streaming over Hypertext Transport Protocol (HTTP), which has been standardized by Moving Picture Experts Group (MPEG), and is an adaptive bitrate streaming technique to enable high quality streaming of media based on conventional HTTP.

However, the method of using the HTML5 video element and MPEG-DASH has the following drawbacks.

Currently, the HTML5 video element supports three video container formats: MP4, WebM, and Ogg. Accordingly, a compatibility problem may occur when a previously installed media service apparatus uses a codec or format not supported by the video element.

MPEG-DASH works by dividing media content into a series of containers. Each container contains media content with a short playback time. Therefore, since an initial delay for storing media data in the container is inherent in the media streaming through MPEG-DASH, a real-time property cannot be ensured when streaming media in the media streaming apparatus.

As another method of playing media on a web browser without a plug-in, there is a method of implementing plug-in code in JavaScript supported by a web browser. In this case, there is an advantage that it is possible to support various container formats. However, due to the characteristics of JavaScript as a dynamic language, it is difficult to support decoding of high framerate (e.g., frames per second (FPS)) and high resolution video.

Accordingly, there is a demand for a method and apparatus for enabling adaptive media streaming when streaming video and audio transmitted over the web, even without a web browser plug-in, as described above.

SUMMARY

One or more example embodiments provide a method and apparatus for streaming media in a web browser without a plug-in.

Aspects of the present disclosure also provide a media streaming method and apparatus capable of performing decoding without depending on a codec supported by a video element of HTML5.

Aspects of the present disclosure also provide an adaptive media streaming method and apparatus capable of performing decoding of high framerate and high resolution video by automatically selecting a decoder according to decoding performance.

Aspects of the present disclosure also provide a media streaming method and apparatus capable of streaming media using a video element of HTML5 even if a previously installed media service apparatus does not use a MPEG-DASH container format.

However, aspects of the present disclosure are not restricted to the ones set forth herein. The above and other aspects of the present disclosure will become more apparent to one of ordinary skill in the art to which the present disclosure pertains by referencing the detailed description given below.

According to an aspect of an example embodiment, there is provided an adaptive media streaming apparatus that may include: a receiver configured to receive media data generated by a media service apparatus using a communication protocol which supports web services; a video web worker configured to determine whether a video codec of video data included in the media data is supported by a first video decoder embedded in a web browser of the adaptive media streaming apparatus; a first video player configured to, in response to the video codec of the video data being unsupported by the first video decoder embedded in the web browser, decode the video data transmitted from the video web worker using a second video decoder written in a script which is supported by the web browser; and a second video player configured to, in response to the video codec of the video data being supported by the video decoder embedded in the web browser, decode the video data transmitted from the video web worker using the first video decoder embedded in the web browser.

According to an aspect of an example embodiment, there is provided an adaptive media streaming apparatus that may include: a configured to receive media data generated by a media service apparatus using a communication protocol which supports web services; a video web worker configured to determine whether a video codec of video data included in the media data is supported by a first video decoder embedded in a web browser of the adaptive media streaming apparatus; a first video player configured to decode the video data transmitted from the video web worker using a second video decoder written in a script which is supported by the web browser; and a second video player configured to, in response to the video codec of the video data being supported by the first video decoder embedded in the web browser and in response to a determination that a decoding delay over a delay threshold has occurred in the first video player, decode the video data using the first video decoder embedded in the web browser.

According to an aspect of an example embodiment, there is provided a media service apparatus for transmitting real-time live video or stored video to a media streaming apparatus. The media service apparatus may include: a module storage configured to store a script module which is supported by a web browser of the media streaming apparatus and is required for playing the real-time live video or the stored video on the web browser; a module transmitter configured to transmit the script module to the media streaming apparatus in response to establishing a connection with the media streaming apparatus; a packetizer configured to packetize the real-time live video or the stored video to generate a transmission packet; and a web server configured to establish a communication session with the media streaming apparatus and transmit the transmission packet to the media streaming apparatus in response to receiving a streaming request from the media streaming apparatus. The script module may include a process of determining which video decoder of a plurality of video decoders being executed in the media streaming apparatus decodes the transmission packet.

A media streaming method and apparatus according to an aspect of an example embodiment may provide improved security because a plug-in is not needed.

Because a decoder is configured with a script that can be parsed by a web browser, it is possible to stream media without depending on a codec format supported by the HTML5 video element.

By moving MPEG-DASH container creation logic to a media streaming apparatus, it is possible to stream media using the HTML5 video element without modifying a conventional media service apparatus using RTSP/RTP protocol.

By performing adaptive media streaming so as to automatically switch a decoder according to a decoding speed in consideration of the decoding performance of the decoder, it is possible to perform decoding of high frames per second (FPS) and high resolution video.

Because a threshold value for determining the decoding performance according to the decoding speed can be optimized through learning, it is possible to perform adaptive media streaming in consideration of the performance of a computer.

The effects and benefits of the present disclosure are not limited to the above-described effects and benefits, and other effects and benefits which are not described herein will become apparent to those skilled in the art from the following description.

BRIEF DESCRIPTION OF THE DRAWINGS

The above and/or other aspects and features of the present disclosure will become more apparent by describing in detail example embodiments thereof with reference to the attached drawings, in which.

DETAILED DESCRIPTION OF THE EMBODIMENTS

Figure 1:
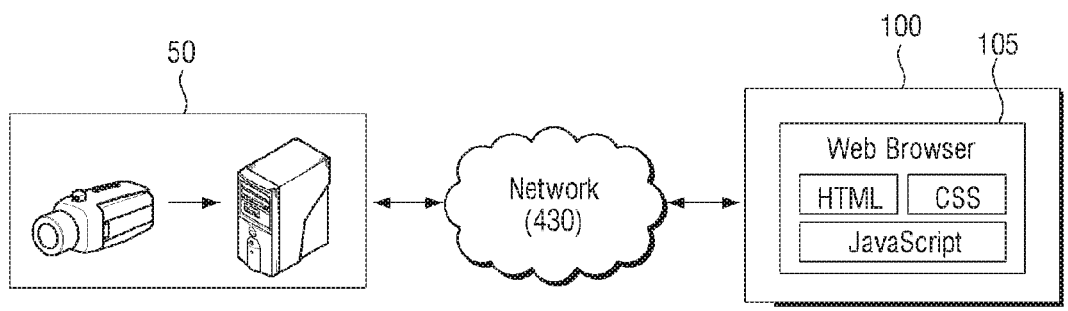
FIG. 1 shows an overall system for media playback in a web browser.

Hereinafter, example embodiments of the present disclosure will be described in detail with reference to the accompanying drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these example embodiments are provided so that this disclosure will be thorough and complete and will fully convey the concept of the disclosure to those skilled in the art, and the present disclosure will only be defined by the appended claims. Like numbers refer to like elements throughout.

The term "streaming" as used herein refers to a method of playing media (e.g., audio, video, etc.) that originates from a remote device where the playback may be initiated after only partially downloading (e.g., buffering) the media without having to download and store the entire content in a local storage first. The term "live streaming" (also referred to as "live media") as used herein refers to a method in which a local device plays media, which is being captured at a remote device (e.g., server) in substantially real time, on a web browser or an application. For example, live events such as sporting events, concerts, performances, news broadcast, etc. may be live streamed while the images and/or sound are being captured. Live streaming does not necessarily imply that the events are being streamed as they happen, but may include a time delay (e.g., a few seconds). The term "recorded streaming" as used herein refers to a method in which a local device plays a streaming media (e.g., image, audio, video, etc.) that is pre-recorded and stored at a remote device. For example, video on-demand (VOD) services may allow a local device to play, on a web browser, a movie that is stored in a remote server. Recorded streaming (also referred to as non-live streaming or recorded media streaming) is different from live streaming in that the media being played back has been already recorded and stored before the playback begins. The term "codec" refers to a device or computer program for encoding and/or decoding a data such as a digital data stream or signal. The term "container" (also referred to as "container format" or "format") is a wrapper, package, or file format for grouping or organizing data. In this disclosure, the terms "codec," "container," and "format" are sometimes used interchangeably unless stated otherwise. For example, "codec/format" or "codec and/or format" may imply either one of codec and container format, or alternatively, both codec and container format. The term "supported by" connotes that a device or software is capable of performing a function, and conversely the term "unsupported by" connotes that the device or software is incapable of performing a function due to incompatibility and/or structural or design limitations. For example, "supported by a web browser" implies that the web browser is capable of performing a certain function or operate with a certain codec, format, script, language, etc., and "unsupported by a web browser" implies that the web browser is not capable of performing the function or operate with the specific codec, format, script, language, etc.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting. As used herein, the singular forms "a," "an," and "the" are intended to include the plural forms as well and vice versa, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Various units and modules disclosed herein may be implemented with software, hardware, or a combination of both.

Hereinafter, the present disclosure will be described in more detail with reference to the accompanying drawings.

FIG. 1 shows an overall system for media playback in a web browser 105. A media service apparatus 50 (e.g., a server) may include a computing or processing device suitable for providing computing services to one or more media playback devices. For example, the media service apparatus 50 may include a device, such as a network camera, a network video recorder (NVR) and a digital video recorder (DVR), capable of generating or storing a media stream and transmitting the media stream to user devices. An adaptive media streaming apparatus 100 (e.g., a client or user device) may include a computing or processing device suitable for interacting with the media service apparatus 50 or other computing user devices via a network 430. For example, the adaptive media streaming apparatus 100 may be a desktop computer, a mobile phone or smartphone, a personal digital assistant (PDA), a laptop computer, or a tablet computer.

Figure 2:
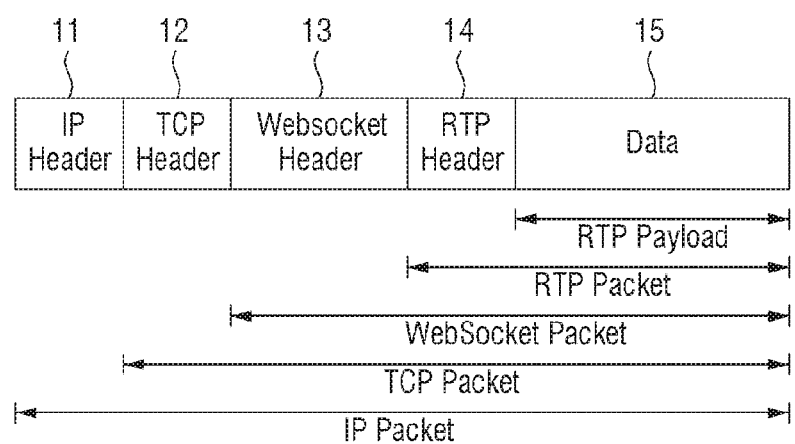
FIG. 2 is a diagram illustrating a structure of a communication packet using an RTSP/RTP protocol transmitted over a WebSocket.
Figure 3:
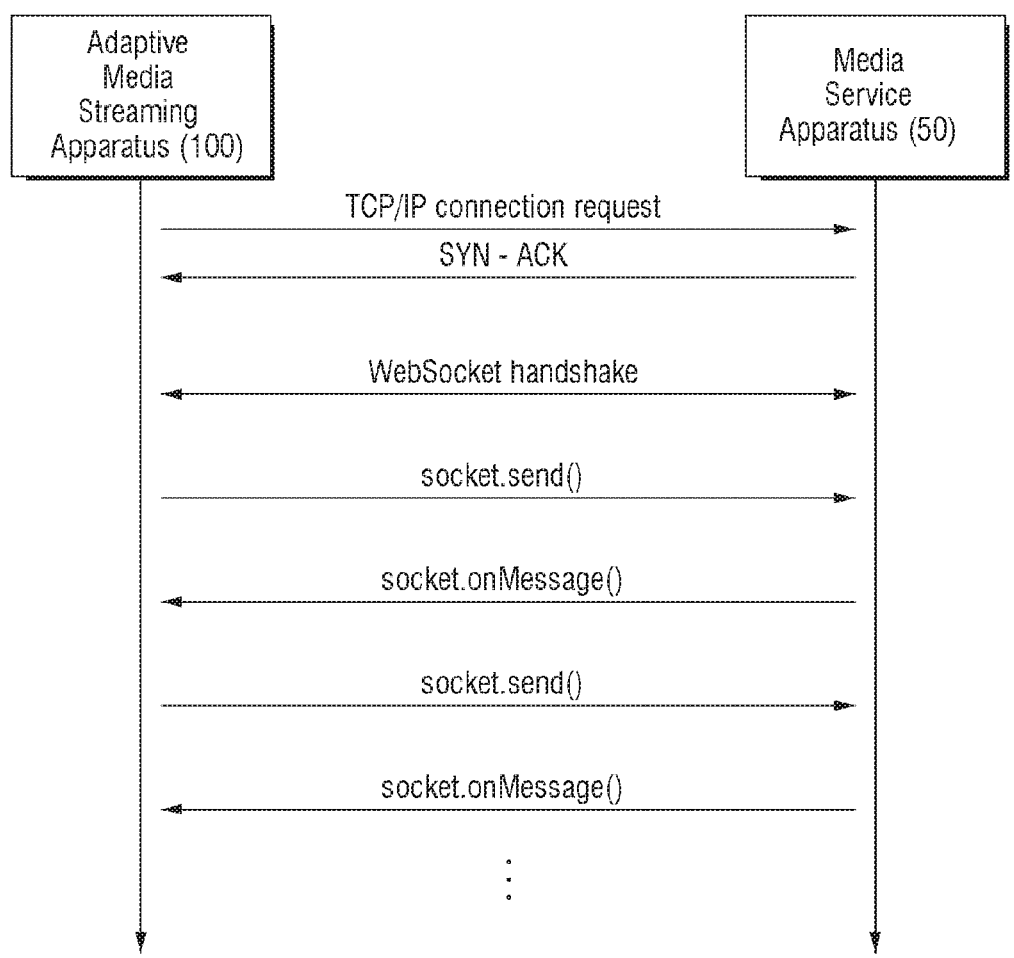
FIG. 3 shows an example of a process of transmitting and receiving data through a WebSocket connection.

FIGS. 2 and 3 are example diagrams for explaining an Real-Time Streaming Protocol/Real-time Transport Protocol (RTSP/RTP) transmission over a WebSocket, which is a communication scheme between the media service apparatus 50 and the adaptive media streaming apparatus 100.

FIG. 2 is a diagram illustrating a structure of a communication packet using an RTSP/RTP protocol transmitted over a WebSocket. WebSocket is a communications protocol for enabling full-duplex communication channels over a single Transmission Control Protocol (TCP) connection. When an RTP header 14 is added to an RTP payload corresponding to data 15, they become an RTP packet. The RTP packet is equal to a WebSocket payload, and a WebSocket header 13 is added to the RTP packet to become a WebSocket packet. The WebSocket packet is equal to a TCP payload, and a TCP header 12 is added to the WebSocket packet to become a TCP packet. Finally, the TCP packet is equal to an Internet Protocol (IP) payload, and an IP header 11 is added to the TCP packet, thereby generating a communication packet, that is, an IP packet. The process of generating the IP packet and a process of removing each header are performed in both the media service apparatus 50 and the adaptive media streaming apparatus 100.

FIG. 3 shows an example of a process of transmitting and receiving data through a WebSocket connection. This WebSocket connection may be established according to a WebSocket protocol that is part of the HTML5 standard. In particular, since the WebSocket connection supports persistent bidirectional communication, data can be continuously transmitted and received between the web server of the network camera and the web browser of the user terminal without being disconnected. As used herein with reference to WebSocket, "continuous" transmission and receipt of data may indicate the absence of a need to establish and/or terminate a connection or communication channel every time a data packet is transmitted. Thus, once a WebSocket connection or communication channel is established, the client 109 and the server 100 may exchange WebSocket data either uninterruptedly or intermittently until the WebSocket connection is terminated. In other words, a continuous transmission of data may not necessarily imply a data transmission without pause or interruption.

Referring to FIG. 3, the adaptive media streaming apparatus 100 transmits a TCP/IP connection request message to the media service apparatus 50, and the media service apparatus 50 accepts it and transmits a TCP response message (SYN-ACK) to the adaptive media streaming apparatus 100, thereby establishing a TCP/IP connection. A TCP transport connection may be formed by a pair of a local TCP socket and a remote TCP socket. Each TCP socket is defined by at least an identifier such as a port number and an IP address. Of course, it is also possible to establish a User Datagram Protocol/IP (UDP/IP)-based connection between them instead of the TCP/IP-based connection.

Then, when the WebSocket connection is established through a handshake process between the adaptive media streaming apparatus 100 and the media service apparatus 50, continuous data transmission/reception between them can be performed thereafter. That is, the adaptive media streaming apparatus 100 transmits a media streaming request to the media service apparatus 50 in the form of a transmission WebSocket packet (socket.send), and the media service apparatus 50 transmits a media stream to the adaptive media streaming apparatus 100 in the form of a response Web- Socket packet (socket.onMessage). This process can be performed continuously between them until media stream transmission is completed or terminated.

Since the communication between the adaptive media streaming apparatus 100 and the media service apparatus 50 is performed through a HTML5-based WebSocket protocol, a module such as a decoder and a renderer may be implemented as a script that is parsed in HTML5. An example of the parsable script may be implemented in JavaScript. Accordingly, media streaming using the RTSP/RTP protocol may be implemented in a web browser without needing to separately install a plug-in such as ActiveX or Netscape Plugin Application Programming Interface (NPAPI) as in a conventional case.

In a streaming method using the RTSP/RTP protocol, rather than transmitting the entire media data, only a few frames of a portion that the user of the adaptive media streaming apparatus 100 wants to watch may be transmitted. That is, if the user finds and clicks (e.g., rewinds, fast-forwards, or skips to) a scene to be viewed, it is played starting from the frame of the corresponding portion, and past frames are automatically deleted, which is a desirable behavior from a security standpoint.

Figure 4:
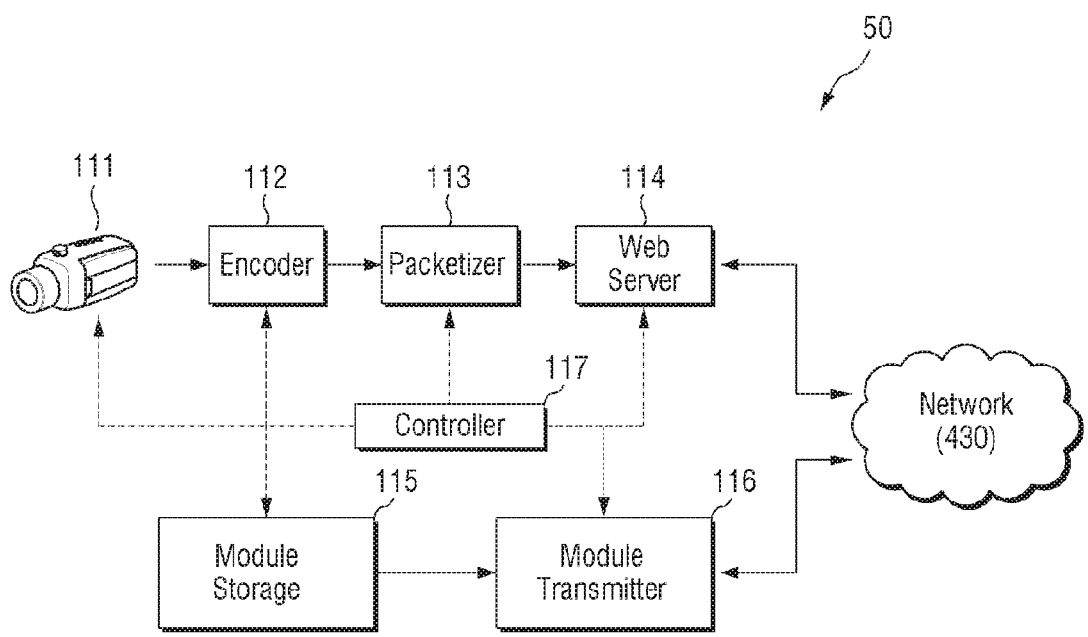
FIG. 4 shows an example embodiment of a configuration of a media service apparatus.

FIG. 4 shows an example embodiment of a configuration of the media service apparatus 50. The media service apparatus 50 may include a real-time video camera 111, an encoder 112, a packetizer 113, a web server 114, a module storage 115, and a module transmitter 116. Each of the components and modules depicted in FIG. 4 and other drawings may be implemented with hardware with circuitry to perform relevant functions, software such as instructions stored in a computer-readable storage medium, or a combination of both.

The real-time video camera 111 may be a means for capturing media in real time, and the capturing of the camera includes a case of performing both video capturing and audio recording and a case of performing only video capturing.

The encoder 112 may be configured to compress and encode the media captured by the real-time video camera 111. The encoding of the encoder 112 is not necessarily performed using a specific codec supported by a decoder embedded in the web browser, but may be performed in any codec or container format.

The packetizer 113 may packetize the encoded media data to generate a transmission packet. The packetization means dividing the media data into appropriate lengths to facilitate transmission via the network 430 or, collectively assigning control information, such as a receiving address, to each data in an appropriate length if the media data is short. In this case, the control information is located in the header of the packet.

The packetizer 113 may be configured to packetize the media data according to a recorded streaming mode requested by the adaptive media streaming apparatus 100. If the adaptive media streaming apparatus 100 requests live streaming as a live streaming mode, the packetizer 113 may generate a transmission packet for each frame of the media. If the adaptive media streaming apparatus 100 requests playback as a playback mode, the packetizer 113 may generate a transmission packet in a container format, each container including a plurality of video frames. Accordingly, if the playback mode is live streaming, decoding is performed on a frame-by-frame basis to enable playback without an initial delay. If the playback mode is recorded streaming, in order to perform decoding using a decoder embedded in a high-performance web browser, a container format supported by the embedded decoder may be configured.

The web server 114 may establish a communication session with the adaptive media streaming apparatus 100. That is, a WebSocket connection may be established between the web server 114 of the media service apparatus 50 and the adaptive media streaming apparatus 100 through a handshake process between them. Thereafter, according to the request of the adaptive media streaming apparatus 100, the transmission packet generated by the packetizer 113 may be transmitted through the web server 114.

The module storage 115 may be a module for storing one or more script modules necessary to play media in the adaptive media streaming apparatus 100. The script module may allow the adaptive media streaming apparatus 100 to play media in a web browser in an HTML5 environment without needing to install a plug-in or a separate application program, using code written in a script that can be parsed by a web browser. The script module will be described later with reference to FIG. 6.

The module transmitter 116 may be a module for transmitting the script module stored in the module storage 115 to the adaptive media streaming apparatus 100. The module transmitter 116 transmits the script module in response to a case where the adaptive media streaming apparatus 100 connects to the media service apparatus 50 via the web browser 105.

Figure 5:
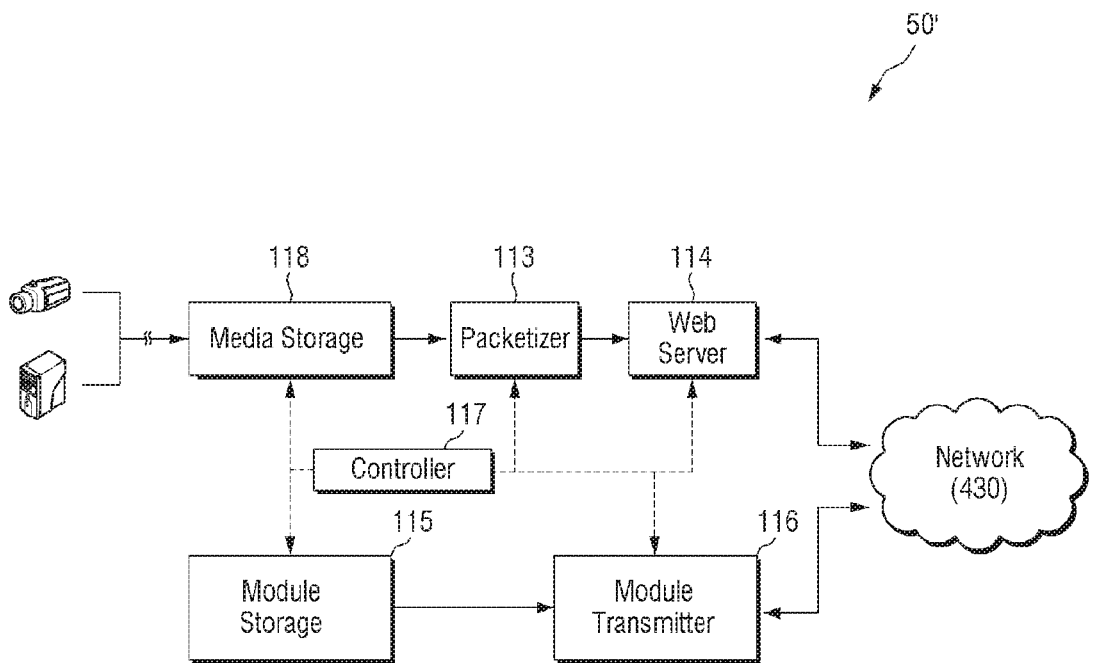
FIG. 5 shows another example embodiment of the configuration of the media service apparatus.

FIG. 5 shows another example embodiment of the configuration of the media service apparatus 50'. The media service apparatus 50' of FIG. 5 represents an example embodiment for transmitting video stored in a media storage 118 (i.e., recorded streaming) while the media service apparatus 50 of FIG. 4 represents an example embodiment for transmitting real-time live video using the real-time video camera 111 (i.e., live streaming).

The media storage 118 may include a network video recorder (NVR) or a personal video recorder (PVR). However, the example embodiment of FIG. 5 will be described in conjunction with the network video recorder. The media storage 118 receives media data from a camera or a server and compresses (e.g., encodes, encrypts, etc.) and stores the received media data. When there is a request for transmission of the stored media data from the adaptive media streaming apparatus 100, the media service apparatus 50' packetizes the media data stored in the media storage 118 in the packetizer 113 and transmits the packetized data through the web server 114. In the example embodiment of FIG. 5, the packetizer 113, the web server 114, the module storage 115, the module transferor 116 and a controller 117 of the configuration of the media service apparatus 50' have been described in the example embodiment of FIG. 4.

Figure 6:
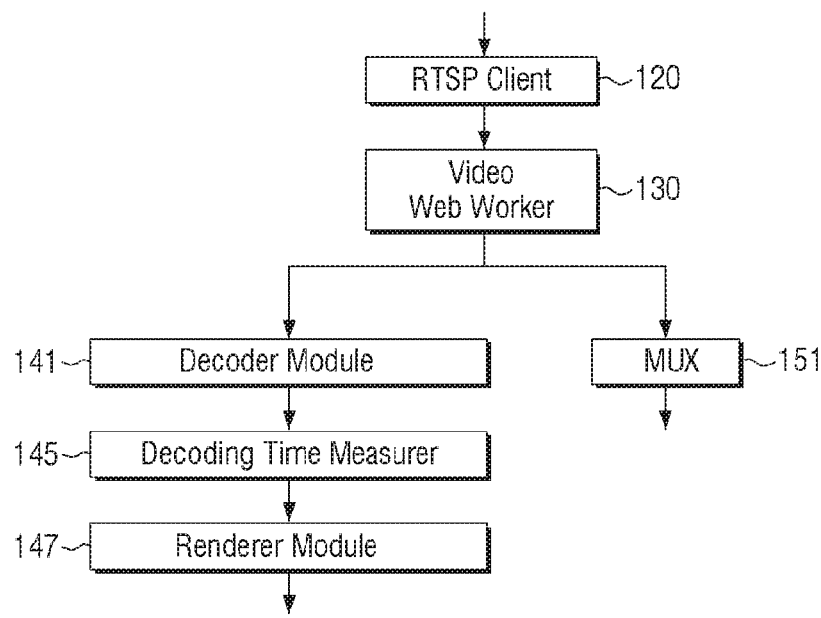
FIG. 6 shows an example embodiment of a script module of a module storage.

FIG. 6 shows an example embodiment of the script module of the module storage 115. In the example embodiment of FIG. 6, the script module may include an RTSP client 120, a video web worker 130, a decoder module 141, a decoding time measurer 145, a renderer module 147 and a multiplexer (MUX) 151. According to an aspect of an example embodiment, the script module may be implemented in JavaScript, which is a script that can be parsed by a web browser.

The RTSP client 120 may be configured to support RTSP/RTP communication with the media service apparatus 50. At present, it is impossible to process media according to the RTSP/RTP protocol on a web browser without a plug-in. When using the RTSP client 120 according to an aspect of an example embodiment, however, it is possible for the adaptive media streaming apparatus 100 to reliably receive media data transmitted through the RTSP/RTP protocol even if its web browser uses a HTTP scheme.

The video web worker 130 may be configured to determine a codec or a container format of the video data transmitted from the RTSP client 120, receive a decoding time from the decoding time measurer 145, determine a decoding delay based on the received decoding time, and transmit the video data to the decoder module 141 or the MUX 151.

The transmission of the video data by the video web worker 130 may be determined differently according to the determination result of the codec and/or format of the video data. In this case, if the codec and/or format of the video data is not a codec and/or format supported by a video tag, the video data is transmitted to the decoder module 141, and if the codec and/or format of the video data is a codec and/or format supported by a video tag, the video data is transmitted to the MUX 151.

The transmission of the video data by the video web worker 130 may be determined differently according to the determination result of the decoding delay and the determination result of the codec format of the video data. In this case, the video data is first transmitted to the decoder module 141. Then, if it is determined that the decoding of the video data, whose codec and/or format is determined to be supported by the video tag, is delayed in the decoder module 141, the video data is transmitted to the MUX 151.

In the video web worker 130, a threshold value for determining whether a decoding delay has occurred (e.g., whether the decoding delay falls within a predetermined acceptable margin) may be set with respect to the decoding time. An initial threshold value may be hard-coded (e.g., by a manufacturer). Thereafter, as the decoding proceeds, the threshold may be adjusted (e.g., automatically without user intervention) to find an optimal threshold value through machine learning in consideration of the computing environment (e.g., network conditions). As used herein, the term "optimal" connotes better than previously determined or substantially or practically best, but does not necessarily imply guaranteeing the absolute theoretical best performance.

The decoder module 141 may be a module for decompressing (e.g., decoding, decrypting, etc.) the encoded media data. The decoder module 141 may be implemented in JavaScript similarly to other modules of the script module. Since the decoder module 141 is implemented in JavaScript, unlike a decoder that is embedded in the web browser, it is possible to decode data in a wider variety of codecs and container formats instead of a limited set of supported codecs and formats.

According to an aspect of an example embodiment, when the decoder module 141 is implemented in JavaScript, for example, it may be represented by the following example code.

```
function HevcDecoder ( ) {
    var_name = "HevcDecoder";
    var self = this;
    this._decoderParameters = null;
    this._isRequestActive = false;
    this._player = null;
    this._requestContext = null;
    this._requestContextQueue = [ ];
    this.pushRequestContext = function (requestContext) {
        self._requestContextQueue.push(requestContext);
    };
```

```
    this.decode = function ( ) {
        if (self._isRequestActive) {
            return;
        }
        if (self._requestContextQueue.length) {
            self._isRequestActive = true;
            self._requestContext = self._requestContextQueue.pop( );
            self._playStream(self._requestContext.stream);
        }
    };
    this._createDecodeCanvas = function(parentElement) {
        self.canvas = document.createElement("canvas");
        self.canvas.style.display = "none";
        self.canvas.id = "decode-canvas";
        parentElement.appendChild(self.canvas);
        self.ctx = self.canvas.getContext("2d");
    };
    this._playStream = function (buffer) {
        this._reset( );
        this._handleOnLoad(buffer);
    }
    this._onImageDecoded = function (image) {
        var width = image.get_width( );
        var height = image.get_height( );
        this.canvas.width = width;
        this.canvas.height = height;
        this._imageData = this.ctx.createImageData(width, height);
        image.display(this._imageData, function (displayImageData) {
            var itemId =
self._requestContext.itemIds[self._requestContext.currentFrameIndex];
            var payload = self._requestContext.payload;
            if (height > payload.displayHeight) {
                payload.displayHeight = height;
            }
            if (!(itemId in self._requestContext.dependencies)) {
                if (width > payload.displayWidth) {
                    payload.displayWidth = width;
                }
                payload.frames.push({
                    canvasFrameData: displayImageData.data,
                    itemId: itemId,
                    width: width,
                    height: height
                });
            }
            self._requestContext.currentFrameIndex++;
            if (self._requestContext.currentFrameIndex >=
self._requestContext.itemIds.length) {
                self._requestContext.callback(payload);
                self._isRequestActive = false;
                self.decode( ); // Decode next queued request
            }
        });
    };
    .
    .
    .
    this._createDecodeCanvas(document.documentElement);
    this._reset( );
}
```

The decoding time measurer 145 may measure the decoding time of the decoder module 141 using an FPS meter and transmit the decoding time to the video web worker 130. As described above, the decoding time measured by the decoding time measurer 145 may be used in the video web worker 130 to determine the decoding performance.

The renderer module 147 may be configured to render media data and display video on an output device such as a monitor or the like. The renderer module 147 may convert the video data in a YUV format into video data in a RGB format using Web Graphics Library (WebGL). WebGL is a web-based graphical library that is available through JavaScript and allows the creation of a three-dimensional (3D) graphical interface.

The MUX 151 may be a module for preventing a compatibility issue due to the container format when using a video tag as one example embodiment of the decoder embedded in the web browser. When using a video tag, which is a decoder embedded in a web browser, the media playback performance may be higher than that of a decoder implemented in JavaScript. However, in the case of conventional MPEG-DASH, since a container is created in the media service apparatus 50 and media is transmitted while being loaded in the container, container creation logic must be implemented in the media service apparatus 50.

If the previously installed media service apparatus 50 does not provide a function of creating a container supporting MPEG-DASH (e.g., legacy equipment that does not support the appropriate container creation function), it must be transmitted separately through a server having a container creation function. Accordingly, by moving the container creation logic to the adaptive media streaming apparatus 100, it is possible to solve the compatibility problem without modifying the existing equipment.

The MUX 151 may be configured to create a container by collecting frames when the video data received from the video web worker 130 is not packaged in containers. Therefore, even when the adaptive media streaming apparatus 100 intends to perform decoding using the video tag and the media data is not generated in the container format by the media service apparatus 50, it does not cause a compatibility problem due to the incompatible container format between the media service apparatus 50 and the adaptive media streaming apparatus 100.

Figure 7:
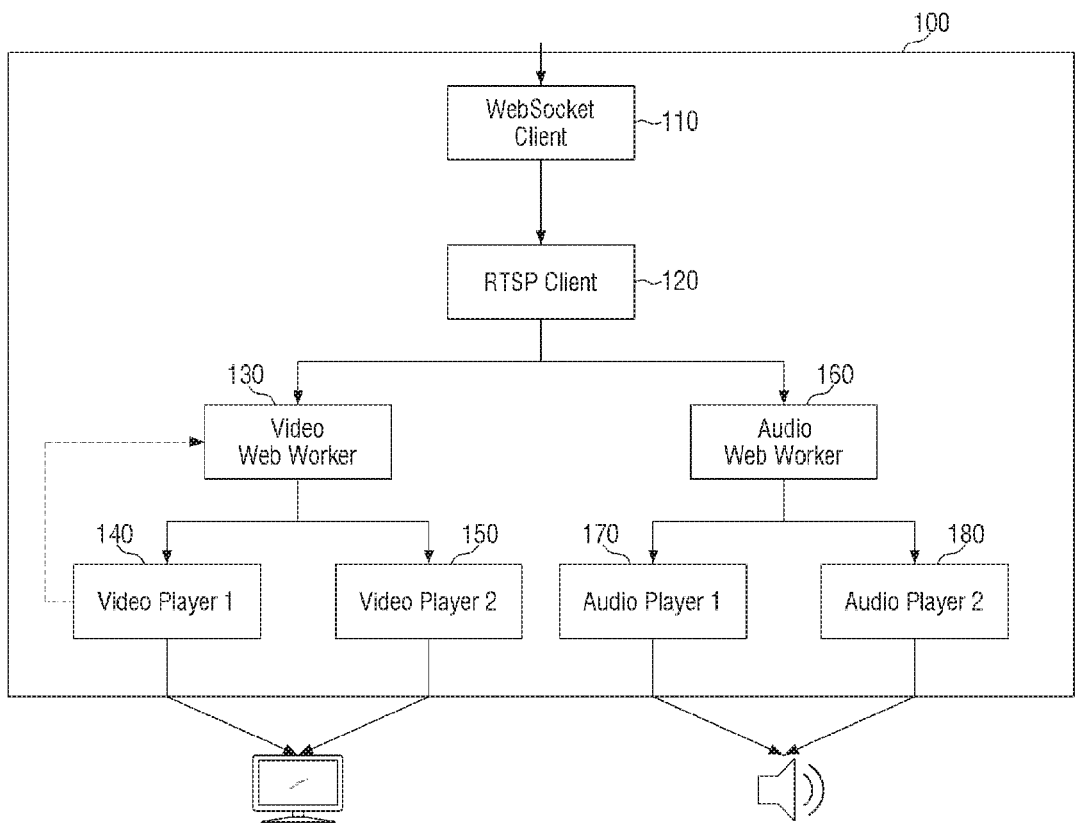
FIG. 7 shows an example embodiment of a configuration of an adaptive media streaming apparatus.

FIG. 7 shows an example embodiment of the configuration of the adaptive media streaming apparatus 100. Referring to FIG. 7, the adaptive media streaming apparatus 100 may include a WebSocket client 110 and the RTSP client 120 serving as a receiver for receiving media data from the server of the media service apparatus 50, the video web worker 130 for transmitting video data to a decoder conforming to the codec and/or container format, and switching the video player by comparing the decoding time with the threshold value, a first video player 140 for playing the video data using a decoder written in a script that can be parsed by the web browser, a second video player 150 for playing the video data using a decoder embedded in the web browser, an audio web worker 160 for transmitting audio data to a decoder conforming to the codec and/or container format, a first audio player 170 for playing the audio data using a decoder written in a script that can be parsed by the web browser, and a second audio player 180 for playing the audio data using a decoder embedded in the web browser.

The embodiment of FIG. 7 represents the configuration of the system for playing both video data and audio data, but a module may be configured to play only video data. That is, in order to play only video data, the entire system may be configured to include the WebSocket client 110, the RTSP client 120, the video web worker 130, the first video player 140 and the second video player 150. Likewise, alternatively a module may be configured to play only video data.

In the adaptive media streaming apparatus 100 of FIG. 7, the video web worker 130 and the audio web worker 160 may be configured as separate threads, so that video data and audio data may be processed in parallel. Therefore, data processing such as codec/format determination may be performed more smoothly.

In the example embodiment of FIG. 7, the decoder written in a script that can be parsed by (e.g., supported by) the web browsers of the first video player 140 and the first audio player 170 may be implemented in JavaScript. The decoders embedded in the web browsers of the second video player 150 and the second audio player 180 may be implemented as a video tag and an HTML5 audio tag, respectively.

In FIG. 7, a dotted arrow is drawn from the first video player 140 to the video web worker 130, which means that the decoding time measured by the first video player 140 may be transmitted to the video web worker 130.

Figure 8:
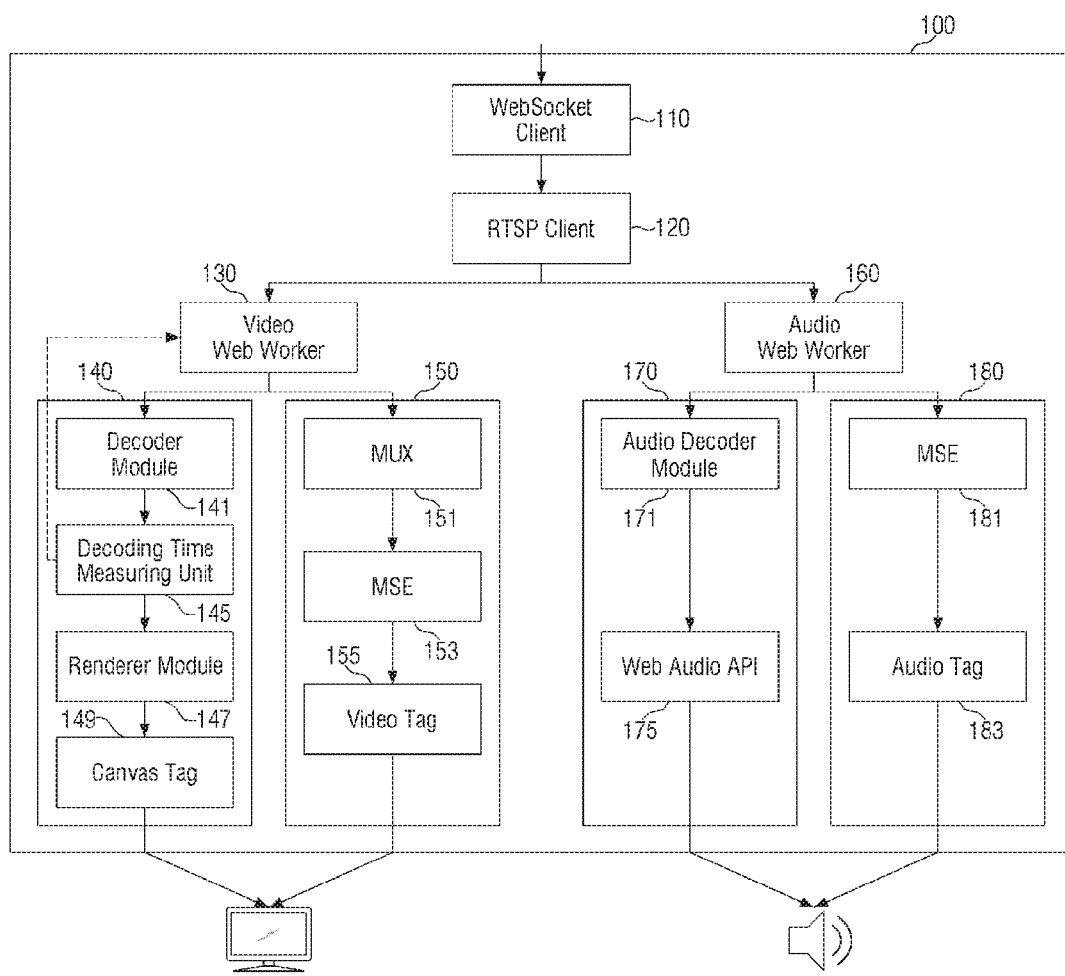
FIG. 8 is an example diagram showing the adaptive media streaming apparatus in more detail.

FIG. 8 is an example diagram showing the adaptive media streaming apparatus 100 in more detail. In FIG. 8, the video web worker 130, the decoder module 141, the decoding time measurer 145, the renderer module 147 and the MUX 150 that are illustrated along the arrows originating from the RTSP client 120 are modules configured using the script module received from the media service apparatus 50.

The WebSocket client 110 and the RTSP client 120 are equivalent to a receiver. The WebSocket client 110 may receive RTSP/RTP media data, which are transmitted over a WebSocket connection, from a server and transfers the media data to the RTSP client 120 implemented in JavaScript. The RTSP client 120 may classify the media data into video data and audio data, and transmit the video data to the video web worker 130 and transmit the audio data to the audio web worker 160.

The video web worker 130 may receive the video data from the RTSP client 120 and the decoding time from the decoding time measurer 145 of the first video player 140, and transfer the video data to an appropriate decoder based on the decoding time and the codec of the video data. A more detailed description will be given with reference to FIG. 9.

Figure 9:
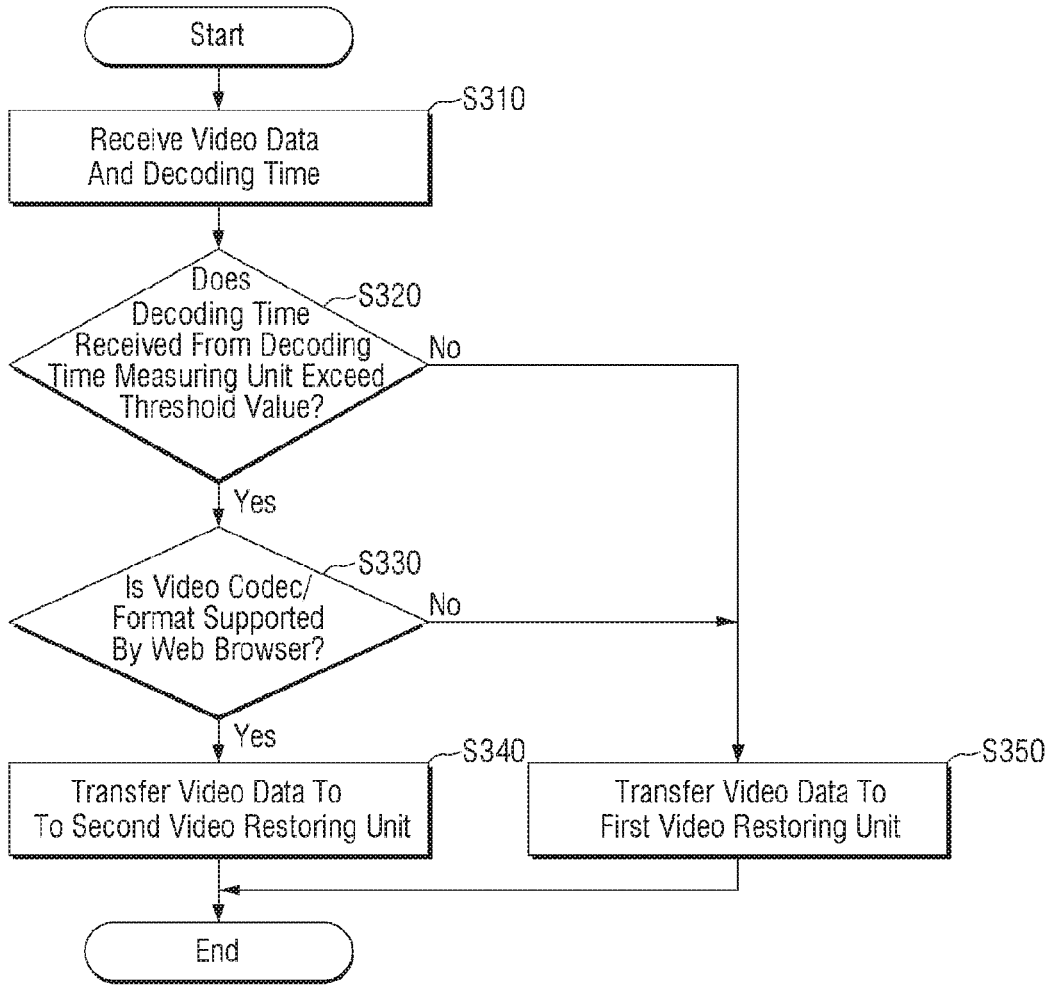
FIG. 9 is a flowchart showing a method of operating a video web worker.

FIG. 9 is a flowchart showing an operation method of the video web worker 130. The video web worker 130 may receive the video data and the decoding time from the RTSP client 120 and the decoding time measurer 145, respectively (S310). The video web worker 130 may set a threshold value for comparison with the decoding time, and an initial threshold value may be selected by the first video player 140 using a predetermined (e.g., hard-coded) value. This is for playing video without an initial delay through the decoder module 141 that performs decoding on a frame-by-frame basis. Thereafter, as the decoding proceeds, an optimal threshold value may be found through machine learning.

The video web worker 130 may determine whether the decoding time received from the decoding time measurer 145 exceeds a threshold value (S320). If the decoding time does not exceed the threshold value, it is determined that the decoding of the decoder module 141 is being performed smoothly (e.g., producing acceptable performance) and the video data is transmitted to the first video player 140. In this case, the video data may be transferred to the decoder of the first video player 140 according to the codec and/or format. This will be described below in detail with reference to FIG. 10.

If the decoding time exceeds the threshold value, however, it is determined whether the codec and/or format of the video data is supported by the video tag (S330). If the codec/format is supported by the video tag, which means decoding is possible using a decoder embedded in the web browser, the video data may be transferred to the second video player 150 (S340). In the case of a codec/format not being supported by the video tag, which means it is necessary to use the decoder module 141 written in JavaScript, the video data may be transferred to the first video player 140 (S350).

Figure 10:
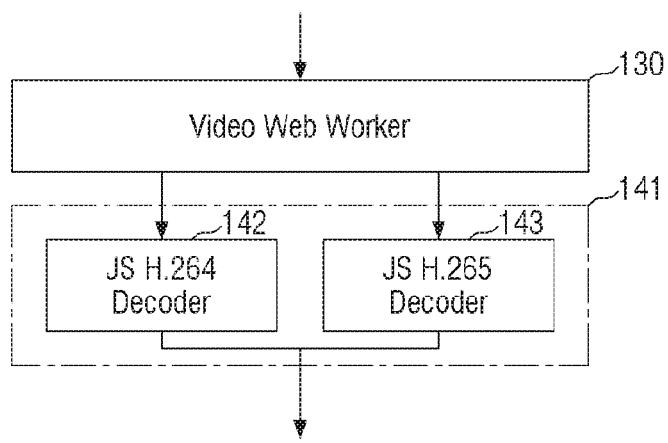
FIG. 10 is an exemplary diagram illustrating that the video web worker transmits video data to a decoder of a first video player 140 according to a container format of video data.

FIG. 10 is an example diagram illustrating that the video web worker 130 transfers video data to a decoder of the first video player 140 that conforms to the codec/format of the video data.

The video web worker 130 may transmit the video data encoded in the H.264 codec to a H.264 decoder module 142 implemented in JavaScript. When the video data is encoded in the H.265 codec, the video data is transferred to a H.265 decoder module 143. In this case, since the decoder module can be added according to the video data codec/format, the codec/format of the video data is not limited to H.264 and H.265.

Referring back to FIG. 8, the first video player 140 may include the decoder module 141, the decoding time measurer 145, the renderer module 147, and a canvas tag 149.

The first video player 140 may receive the video data from the video web worker 130, and the decoder module 141 may decode the video data. The video data may be rendered through the renderer module 147 and the canvas tag 149, and played on a web page.

The decoding time measurer 145 may measure the decoding time of the decoder module 141 using a FPS meter and transmit the decoding time to the video web worker 130. The FPS meter may be a hardware circuitry and/or software logic designed to measure and calculate the frames being decoded per unit time. The decoding time measured by the decoding time measurer 145 may be transmitted to the video web worker 130 and used to determine the decoding performance of the decoder module 141.

The decoder module 141 may not necessarily have to separately perform coding using JavaScript, but may implement the existing code written in C and/or C++ language using a compiler (e.g., code converter) such as Emscripten. Since the decoder module 141 is implemented in JavaScript such that decoding is possible even in a codec/format that is not supported by a video element, the dependency on the codec/format can be lowered.

The video data decoded according to the codec/format is displayed on the web browser through the renderer module 147 and the canvas tag 149. The canvas tag 149 is an element of HTML5 that allows two-dimensional (2D) shapes and bitmap images to be dynamically rendered. That is, it may be regarded as a paint program on the web browser. Since it is a function supported by most of the latest versions of web browsers, the media may be processed on a frame-by-frame basis by the decoder implemented in JavaScript and displayed on the web browser by using the canvas tag 149.

The second video player may include the MUX 151 as a container creating module, Media Source Extensions (MSE) 153 as code embedded in the web browser, and a video tag 155.

If the video data received from the video web worker 130 is not in a container format, the MUX 151 may create a container by collecting frames. The video data that has passed through the MUX 151 may be transferred to the MSE 153 and the video tag 155 without a compatibility problem due to an incompatible container format.

The MSE 153 may be a JavaScript application programming interface (API) for HTML5, which is created for video streaming playback using HTTP download. This technology, standardized by the World Wide Web Consortium (W3C), enables streaming playback on a gaming console, such as Xbox and PlayStation 4 (PS4), or a digital media player, such as Chromecast.

In the video tag 155, decoding and rendering are performed to display video on the screen. When using the video decoder of the video tag 155, decoding can be performed with better performance than the decoder module 141 having limitations due to the characteristics of JavaScript as a dynamic language. That is, it is possible to perform decoding with high frames per second (FPS) and high resolution video.

The processing of audio data is also performed according to the codec/format, similarly to the processing of video data. The audio web worker 160 transfers audio data received from the RTSP client 120 to an appropriate decoder according to the codec/format.

Figure 11:
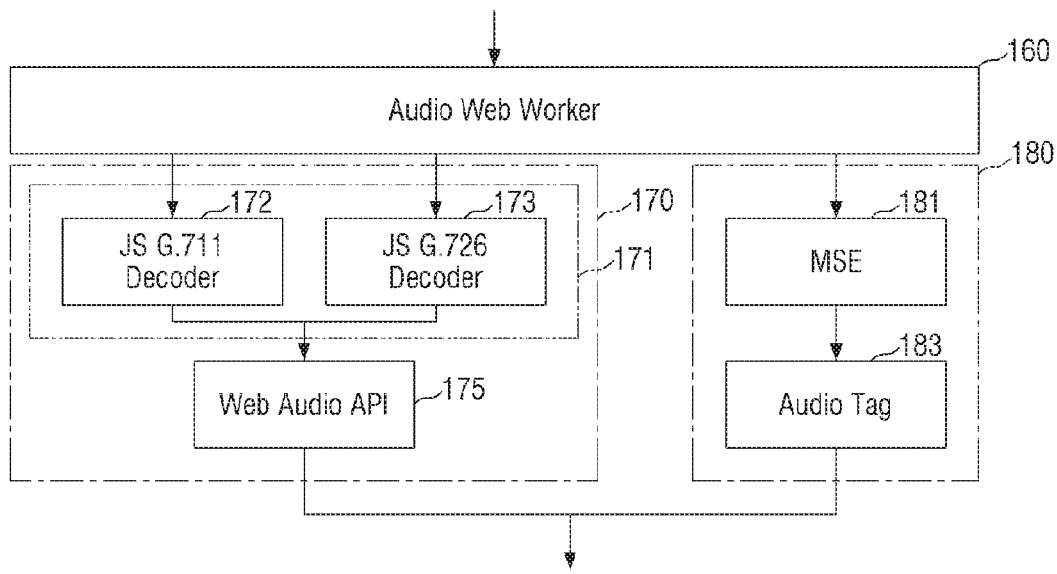
FIG. 11 is an exemplary diagram illustrating that an audio web worker transmits audio data to a decoder according to a container format of audio data.

FIG. 11 is an example diagram illustrating that the audio web worker 160 transfers audio data to a decoder conforming to the codec format of the audio data. If the audio data is encoded with G.711 and G.726 codecs, since they are not codecs supported by the decoder embedded in the web browser, the audio web worker 160 may transfer the audio data to a G.711 decoder module 172 and a G.726 decoder module 173 of the first audio player 170, respectively. In this case, since the audio decoder can be added according to the audio codec similarly to the decoder module 141, the codec of the audio data is not limited to G.711 and G.726. If the audio data is AAC encoded audio data, since the audio data can be decoded by the code embedded in the web browser, the audio data is transferred to the second audio player 180.

Referring back to FIG. 8, the first audio player 170 may include a web audio API 175 and an audio decoder module 171 implemented in JavaScript. The audio decoder module 171 may be implemented by converting conventional native code written in C or C++ language into JavaScript using a compiler such as Emscripten similarly to the decoder module 141.

The audio data decoded by the audio decoder module 171 may be played in the web browser through the web audio API 175. The web audio API 175 is a JavaScript API for processing and synthesizing audio in web applications.

The second audio player may include Media Source Extensions (MSE) 181 and an audio tag 183 embedded in the web browser. The MSE 181 supports audio data received from the audio web worker 180 to be played seamlessly. The audio tag 183 decodes the audio data transmitted from the MSE 181 and plays the audio data in the web browser 105.

Figure 12:
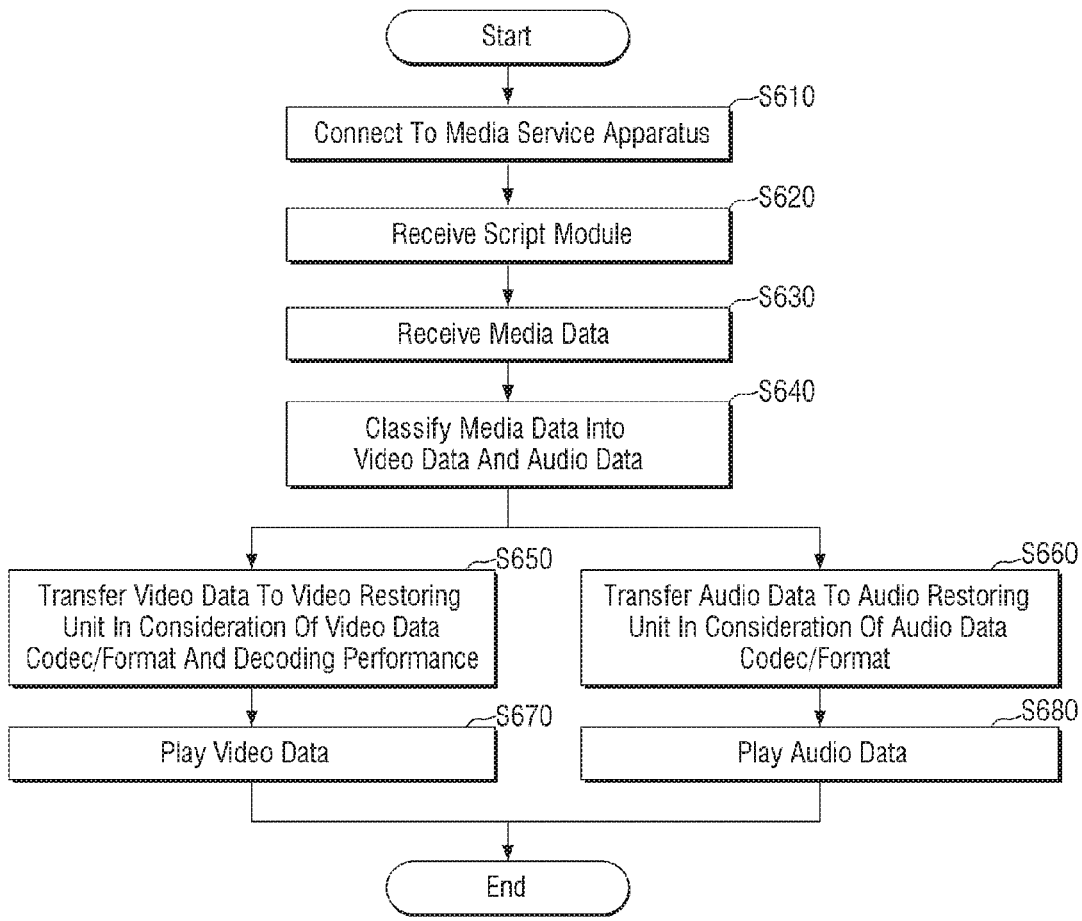
FIG. 12 is a flowchart schematically showing an adaptive media streaming method according to an example embodiment.

FIG. 12 is a flowchart schematically illustrating an adaptive media streaming method according to an example embodiment. The adaptive media streaming apparatus 100 may connect to the media service apparatus 50 via the web browser 105 (S610), and receive the script module stored in the module storage 115 from the media service apparatus 50 (S620). Then, the adaptive media streaming apparatus 100 may receive media data from the media service apparatus 50 (S630), and classify the received media data into video data and/or audio data (S640). The video data may be transferred to the video player in consideration of the codec and/or format and the decoding performance (S650). The audio data may be transferred to an appropriate audio player in consideration of the codec and/or format (S660). The video data may be played on the web page through the selected video player (S670), and the audio data may be played on the web page through the selected audio player (S680).

In the above description, the web browser may be a commonly known browser such as Google Chrome, Microsoft Explorer, Mozilla Firefox, and Apple Safari installed on a desktop computer, a laptop computer, or a mobile device, or alternatively a software application that is created using APIs or resources of the web browser.

Figure 13:
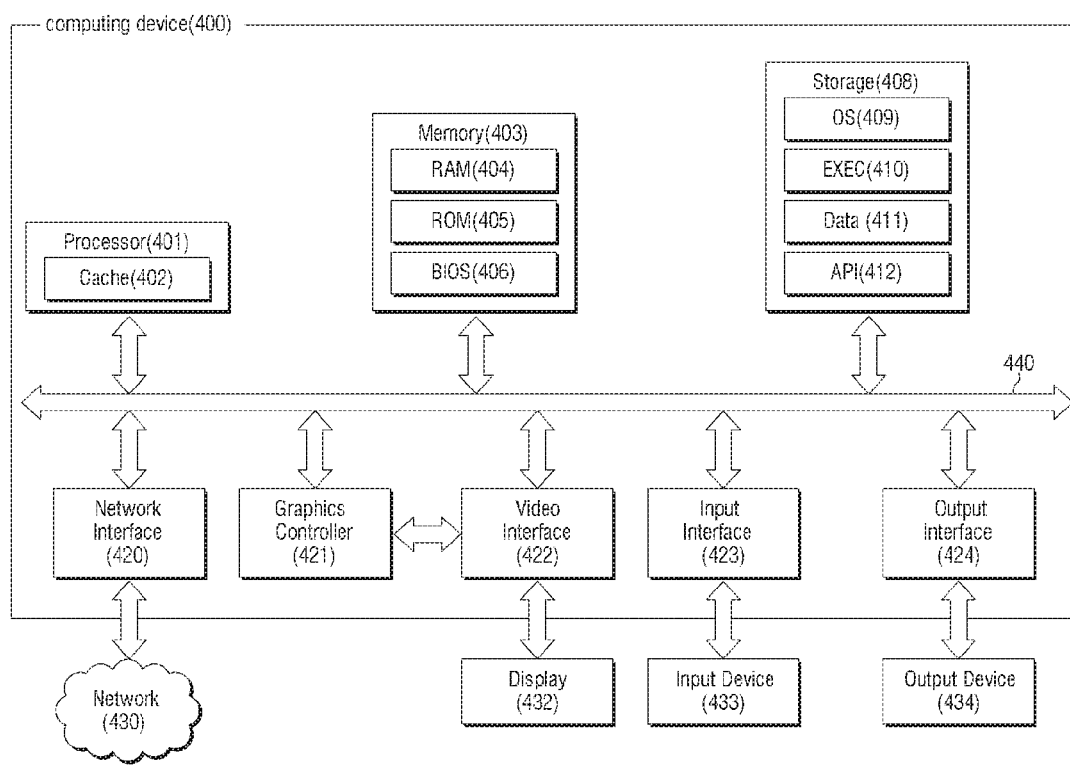
FIG. 13 is an exemplary diagram illustrating a computing device for implementing an adaptive media streaming apparatus.

The adaptive media streaming apparatus 100 shown in FIG. 1 may be implemented, for example, as a computing device 400 shown in FIG. 13. The computing device 400 may be, but is not limited to, mobile handheld devices (e.g., smartphones, tablet computers, etc.), laptop or notebook computers, distributed computer systems, computing grids or servers. The computing device 400 may include a processor 401, a memory 403, and storage 408 that communicate with each other or with other elements via a bus 440. The bus 440 may be coupled to a display 432, at least one input device 433, and at least one output device 434. Each of the elements depicted in FIG. 13 and other drawings may be implemented with hardware with circuitry to perform relevant functions, software such as instructions stored in a computer-readable storage medium, or a combination of both.

All of these elements may be connected to the bus 440 directly or via one or more interfaces or adapters. The bus 440 is coupled to a wide variety of subsystems. The bus 440 may include a memory bus, a memory controller, a peripheral bus, a local bus, and a combination thereof.

The processor (e.g., a central processing unit (CPU)) 401 optionally includes a cache memory 402, which is local storage for temporarily storing instructions, data, or computer addresses. The processor 401 executes instructions (or software modules) written to a computer-readable storage medium, such as the memory 403 or the storage 408. The computer-readable storage medium may store software modules implementing particular embodiments, and the processor 401 may execute the stored software modules.

The memory 403 may include a random access memory (RAM) 404, a read-only memory (ROM) 405, or a combination thereof. Further, a basic input/output system (BIOS) or firmware having basic routines necessary for booting in the computing device 400 may be included in the memory 403.

The storage 408 is used to store an operating system (OS) 409, executable files (EXEC) 410 such as applications, data 411, API 412, and the like. The storage 408 may be a hard disk drive, an optical disk drive, a solid-state drive (SSD), or the like.

The computing device 400 may include the input device 433. The user may enter commands and/or information into the computing device 400 via the input device 433. Examples of the input device 433 may include a keyboard, a mouse, a touch pad, a joystick, a game pad, a microphone, an optical scanner, and a camera. The input device 433 may be connected to the bus 440 via an input interface 423 including a serial port, a parallel port, a game port, a Universal Serial Bus (USB), and the like.

According to an aspect of an example embodiment, the computing device 400 is connected to the network 430. The computing device 400 may be connected to other devices via the network 430. In this case, the network interface 420 receives communication data in the form of one or more packets from the network 430, and the computing device 400 stores the received communication data for the processing of the processor 401. Similarly, the computing device 400 stores the transmitted communication data in the form of one or more packets in the memory 403, and the network interface 420 transmits the communication data to the network 430.

The network interface 420 may include a network interface card, a network adapter, a modem, and the like. Examples of the network 430 may include the Internet, a wide area network (WAN), a local area network (LAN), a virtual network, a telephone network, a direct connection communication, and the like, and a wired and/or wireless communication scheme may be employed.

The execution result of the software module by the processor 401 may be displayed through the display 432. Examples of the display 432 may include a liquid crystal display (LCD), an organic liquid crystal display (OLED), a cathode ray tube (CRT), a plasma display panel (PDP), and a head-mounted display (HMD). The display 432 is connected to the bus 440 via a video interface 422 and the data transfer between the display 432 and the bus 440 can be controlled by a graphics controller 421 (also referred to as a graphics card, a graphics adapter, or a graphics processing unit).

In addition to the display 432, the computing device 400 may include at least one output device 434, such as an audio speaker and a printer. The output device 434 is coupled to the bus 440 via an output interface 424. The output interface 424 may be, for example, a serial port, a parallel port, a game port, a USB, a Video Graphics Array (VGA) port, High-Definition Multimedia Interface (HDMI) port, a Digital Visual Interface (DVI) port, a DisplayPort, or the like.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. An adaptive media streaming apparatus comprising:
   a receiver;
   a video web worker;
   a first video player;
   a second video player;
   the receiver receiving media data generated by a media service apparatus using a communication protocol which supports web services;
   the video web worker configured to determine that a video codec used to encode video data in the media data is supported by a first video decoder and configured to determine that a decoding delay over a delay threshold has occurred in the first video player;
   the first video player configured to decode a portion of the video data transmitted from the video web worker using a second video decoder; and
   the second video player configured to decode another portion of the video data using the first video decoder upon determination that the video codec is supported by the first video decoder and upon determination that the decoding delay over the delay threshold has occurred, wherein
      the first video decoder is embedded in a web browser of the adaptive media streaming apparatus that allows the adaptive media streaming apparatus to play the media data without installing a plug-in, and
      the second video decoder is written in a script which is supported by the web browser that allows the adaptive media streaming apparatus to play the media data without installing a plug-in.

2. The adaptive media streaming apparatus of claim 1, wherein a decoding time measurer measures a frame rate of the video data being decoded by the first video player using a frames per second (FPS) meter to determine that the decoding delay of the first video player is over the delay threshold.

3. The adaptive media streaming apparatus of claim 1, further comprising:
   an audio web worker determining that an audio codec of audio data included in the media data is supported by a first audio decoder embedded in the web browser;
   a first audio player, in response to the audio codec of the audio data being unsupported by the first audio decoder embedded in the web browser, decoding the audio data transmitted from the audio web worker using a second audio decoder written in the script; and a second audio player, in response to the audio codec of the audio data being supported by the first audio decoder embedded in the web browser, decoding the audio data transmitted from the audio web worker using the first audio decoder embedded in the web browser.

4. The adaptive media streaming apparatus of claim 1, wherein the script is JavaScript.

5. The adaptive media streaming apparatus of claim 3, wherein the first video decoder and the first audio decoder are a video tag and an audio tag, respectively, according to a HTML5 standard.

6. The adaptive media streaming apparatus of claim 3, wherein the video web worker is further configured to transmit the video data to the first video player or the second video player according to the video codec used to encode the video data and whether the decoding delay over the delay threshold has occurred, and wherein the audio web worker is further configured to transmit the audio data to the first audio player or the second audio player according to the audio codec of the audio data.

7. An adaptive media streaming apparatus comprising:
a receiver;
a video web worker;
a first video player;
a second video player;
the receiver receiving media data generated by a media service apparatus using a communication protocol which supports web services;
the video web worker configured to determine that a video codec used to encode video data in the media data is supported by a first video decoder and configured to determine that a decoding delay over a delay threshold has occurred in the first video player;
the first video player configured to decode a portion of the video data transmitted from the video web worker using a second video decoder; and
the second video player configured to decode another portion of the video data using the first video decoder upon determination that the video codec is supported by the first video decoder and upon determination that the decoding delay over the delay threshold has occurred, wherein the first video decoder is embedded in a web browser of the adaptive media streaming apparatus, and
the second video decoder is written in a script which is supported by the web browser.

8. The adaptive media streaming apparatus of claim 7, wherein a decoding time measurer measures a frame rate of the video data being decoded by the first video player using a frames per second (FPS) meter to determine that the decoding delay of the first video player is over the delay threshold.

9. The adaptive media streaming apparatus of claim 7, wherein the video web worker is configured to adjust, through machine learning, a threshold value used for determining the decoding time received from a decoding time measurer.

10. The adaptive media streaming apparatus of claim 7, further comprising:
an audio web worker determining that an audio codec of audio data included in the media data is supported by a first audio decoder embedded in the web browser;
a first audio player, in response to the audio codec of the audio data being unsupported by the first audio decoder embedded in the web browser, decoding the audio data transmitted from the audio web worker using a second audio decoder written in the script; and
a second audio player, in response to the audio codec of the audio data being supported by the first audio decoder embedded in the web browser, decoding the audio data transmitted from the audio web worker using the first audio decoder embedded in the web browser.

11. The adaptive media streaming apparatus of claim 7, wherein the script is JavaScript.

12. The adaptive media streaming apparatus of claim 10, wherein the first video decoder and the first audio decoder are a video tag and an audio tag, respectively, according to a HTML5 standard.

13. The adaptive media streaming apparatus of claim 10, wherein the video web worker is further configured to transmit the video data to the first video player or the second video player according to the video codec used to encode the video data and whether the decoding delay over the delay threshold has occurred, and wherein the audio web worker is further configured to transmit the audio data to the first audio player or the second audio player according to the audio codec of the audio data.

* * * * *